United States Patent [19]

McBrierty et al.

[11] Patent Number: 5,154,861
[45] Date of Patent: Oct. 13, 1992

[54] LASER CURING OF CONTACT LENS

[75] Inventors: Vincent McBrierty, Dublin; John Magan, Killashee; Werner Blau, Dalkey, all of Ireland

[73] Assignee: Bausch & Lomb Incorporated

[21] Appl. No.: 662,854

[22] Filed: Mar. 1, 1991

[30] Foreign Application Priority Data

Mar. 13, 1990 [IE] Ireland .................................. 903/90

[51] Int. Cl.$^5$ .............................................. B29D 11/00
[52] U.S. Cl. ...................................... 264/1.4; 264/2.1; 264/25
[58] Field of Search ............................ 264/1.4, 2.1, 25

[56] References Cited

U.S. PATENT DOCUMENTS 4,113,224  9/1978  Clark et al. .......................... 264/2.2

FOREIGN PATENT DOCUMENTS 0202803  5/1986  European Pat. Off. .
322353  6/1989  European Pat. Off. ............. 264/1.4
2082107  3/1982  United Kingdom ................. 264/1.4

Primary Examiner—James Lowe

[57] ABSTRACT

A process for curing photopolymerizable contact lens materials with laser radiation having a wavelength in the ultraviolet region.

9 Claims, 6 Drawing Sheets

LASER CURING OF CONTACT LENS

The present invention relates to a process for curing a photopolymerisable contact lens material using coherent radiation.

Soft contact lenses are presently manufactured by injecting a hydrogel monomer mix into a mould which is rotated and exposed to ultraviolet radiation from a mercury lamp to photopolymerise the monomer mix. The hydrogel monomer mix consists of hydroxyethyl methacrylate, ethylene glycol dimethacrylate, ethylene glycol and a benzoin methyl ether photoinitiator. The hydrogel monomer mix is usually exposed to the ultraviolet radiation from an array of mercury lamps for at least ten minutes to induce photopolymerisation after which the moulds are immersed in hot water to remove the ethylene glycol and other unpolymerised materials and to release the lens from the mould. The polymerisation process must be carried out in the presence of an unreactive gas, for example nitrogen, in order to exclude oxygen which if present would inhibit the polymerisation.

A major disadvantage of the above process is that all extraneous radiations from the mercury lamps must be removed using optical filters. The optical filters and the mercury lamps must be water cooled both to filter out infrared radiation and also to prevent overheating. Also, the mercury lamps have a limited lifetime and must be replaced periodically. Moreover, the ultraviolet radiation output from the mercury lamps decreases with operating time and therefore requires regular monitoring. In addition most of the energy of the lamps is discarded.

An object of the present invention is to mitigate the above disadvantages of curing contact lenses.

According to the invention there is provided a process for curing a photopolymerisable contact lens material comprising the step of irradiating the photopolymerisable contact lens material with laser radiation having a wavelength of between approximately 200 nm to approximately 400 nm, for a predetermined time period.

Preferably the contact lens material comprises a hydrogel monomer mix. The hydrogel monomer mix preferably comprises hydroxyethyl methacrylate, ethylene glycol dimethacrylate, ethylene glycol and a benzoin methyl ether photoinitiator.

Further preferably, the contact lens material is rotated in a mould during laser irradiation.

More preferably, the contact lens material is irradiated in an oxygen free environment. Further preferably, the contact lens material is irradiated in the presence of a gas unreactive relative to the contact lens material under the conditions of curing. The unreactive gas is preferably argon, or nitrogen.

Suitable lasers preferably comprise the excimer lasers (XeF, XeCl and KrF operating at 351 nm, 308 nm and 248nm respectively) the nitrogen laser operating at 337 nm, solid state lasers operating at approximately 355 nm, and the ultraviolet output radiation of the Argon and Krypton ion lasers.

The selected lasers operate at suitable pulse energy levels and repetition rates to achieve photopolymerisation of the contact lens material in a reasonably short time period.

The advantages of the invention are that there is improved control and shorter polymerisation times are achieved, and there is less maintenance required of the laser equipment than for mercury lamps and attendant technology. In addition, the use of a laser enables automation of the process to be achieved easily and also there is no cooling or optical filtering equipment necessary as with mercury lamps.

Embodiments of the invention will now be described, by way of example, with reference to the accompanying drawings, in which.

Figure 1:
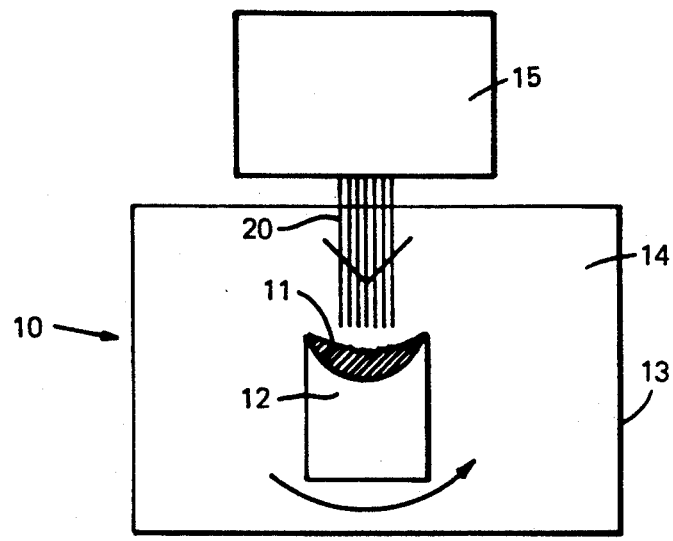
FIG. 1 is a diagrammatic view of an apparatus for carrying out the process according to the invention.

Referring now to FIG. 1, there is shown therein an apparatus generally indicated at 10 for carrying out the process according to the invention. A conventional soft contact lens material 11 in the form of a hydrogel monomer mix is placed in a rotatable mould 12 which can be rotated at a suitable speed for example 350 rpm as is known in the art. The lens material 11 and mould 12 are located in a housing 13 defining a substantially oxygen free chamber 14. The chamber 14 has an unreactive gas such as nitrogen or argon introduced therein. The mould 12 containing the contact lens material 11 is rotated at a suitable speed so as to form an inner concave surface on the eventual lens. The ultraviolet laser 15 is then operated producing a laser beam 20 which is directed onto the lens material 11 at a suitable pulse energy level and repetition rate and for a sufficient period of time to polymerise the contact lens material 11. Clearly, the laser beam 20 is of a sufficient width to cover the lens material 11 or it may be off-set from the axis of rotation to enable all the lens material to be irradiated.

Figure 2:
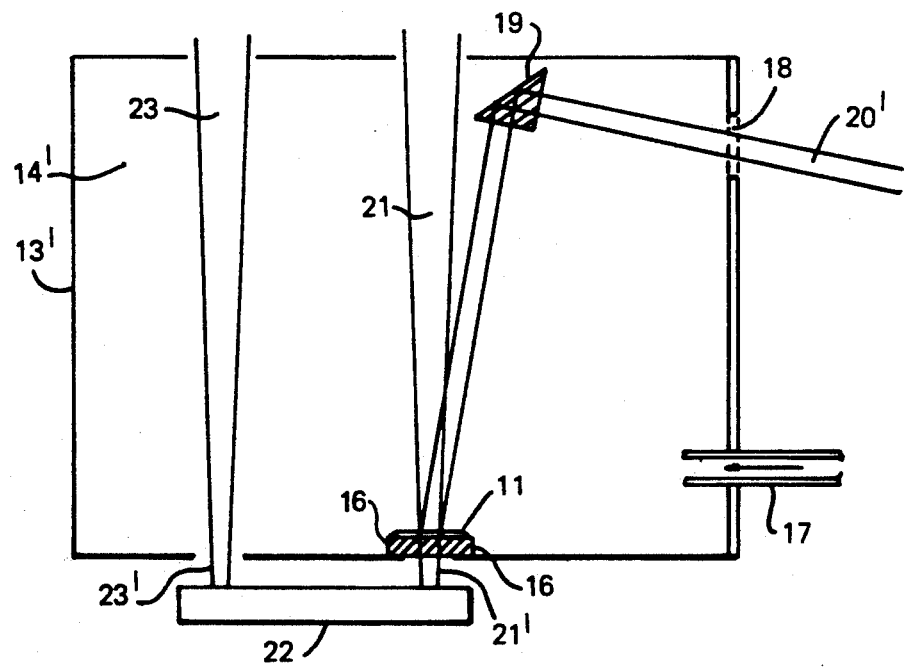
FIG. 2 is a diagrammatic view of an apparatus for monitoring the amount of photopolymerisation in a sample of contact lens material.

The degree of polymerisation of the contact lens material 11 can be continuously monitored using the arrangement shown in FIG. 2, or a similar arrangement. As shown, the contact lens material 11 is placed on a NaCl substrate 16 in a chamber 14' defined by a housing 13'. The chamber 14' is oxygen free and argon gas is introduced via a conduit 17. An ultraviolet laser beam 20' is directed into the chamber 14' via a window 18 and is reflected by a quartz prism 19 and directed onto the contact lens material 11. The substrate 16 may be rotated in conventional manner.

Figure 3:
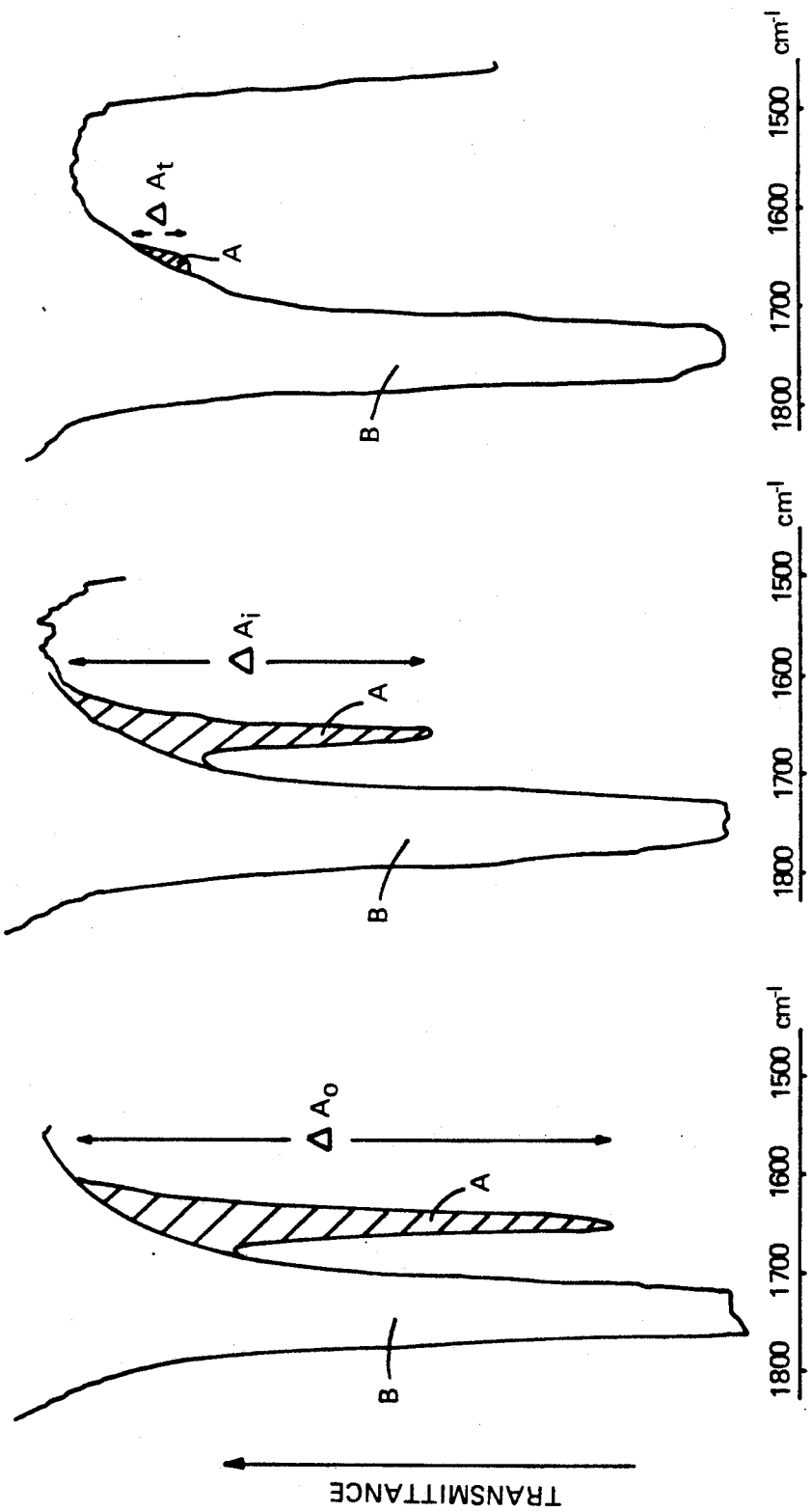
FIG. 3a, 3b and 3c are graphs showing the change in an infrared spectrum during photopolymerisation.

An infrared light beam 21 is directed through the contact lens material 11 and the infrared beam 21' transmitted by the sample 11 is monitored by an infrared spectrometer 22. A reference infrared light beam 23 is also directed into the chamber 14' and the transmitted reference beam 23' is also monitored by the spectrometer 22. The output spectrum of the spectrometer 22 demonstrating the progressive cure of the lens material 11 is shown in FIGS. 3a, 3b and 3c. The spectrometer 22 compares the sample beam 21' with the reference beam 23' and provides the IR absorbance spectrum of the sample material 11 as shown in each of FIGS. 3a, 3b and 3c. In FIGS. 3a, 3b and 3c the absorbance peak B is the carbon oxygen c=o absorbance peak at 1720 cm$^{-1}$ and the absorbance peak A is the carbon carbon c=c absorbance at peak 1640 cm$^{-1}$. FIG. 3a provides the absorbance spectrum prior to any polymerisation of the sample material 11 and thus the carbon carbon, c=c absorbance peak is at a maximum as shown by Ao. FIG. 3b represents the absorbance spectrum at an intermediate stage of polymerisation of the sample material 11 and thus the carbon carbon, c=c absorbance peak Ai has reduced in size. FIG. 3c represents the absorbance spectrum after a time t when almost complete polymerisation of the sample 11 has occurred and thus the absorbance peak A has diminished in size as shown to $A_t$. It will be clear that the size of the carbon oxygen c=o absorbance peak remains constant as this is not affected by the polymerisation of the sample contact lens material 11.

As is known in the art, due to the absorbance by the monomer the amount of infrared absorption decreases with polymerisation of a hydrogel monomer mix, and FIG. 3a illustrates no polymerisation, FIG. 3b illustrates a moderate amount of polymerisation and FIG. 3c illustrates almost complete transmission of the infrared sample beam 21' at 1640 cm$^{-1}$ and thus almost complete polymerisation of the contact lens material 11'.

EXAMPLE 1

Figure 4:
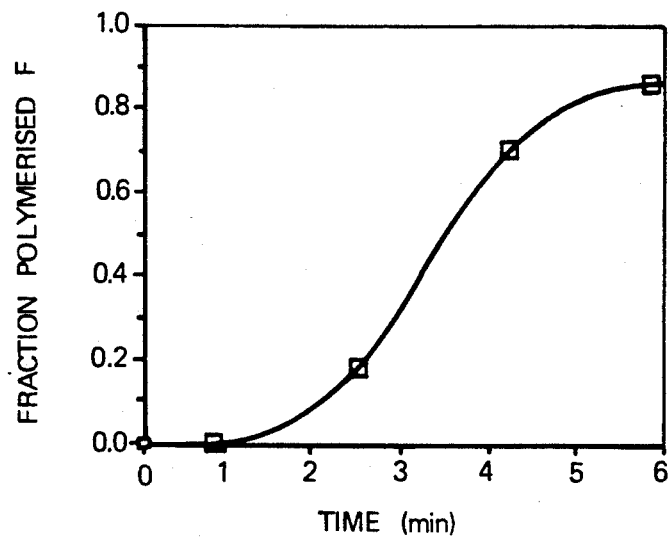
FIG. 4 is a graph showing the curing curve of a contact lens material irradiated as described in example 1.

A sample of typically 10 micro-liters of conventional hydrogel monomer mix was spread on a CaF substrate and exposed in an oxygen free chamber to a XeF excimer laser emitting laser beam of 351 nm pulses at a 4 Hz repetition rate and with a pulse energy of 35 mJ. The degree of polymerisation was monitored periodically using the infrared technique described above. The results are shown in FIG. 4 which is a graph illustrating fraction polymerised against time in minutes. As shown, the sample was approximately 85% polymerised after six minutes.

EXAMPLE 2

Figure 5:
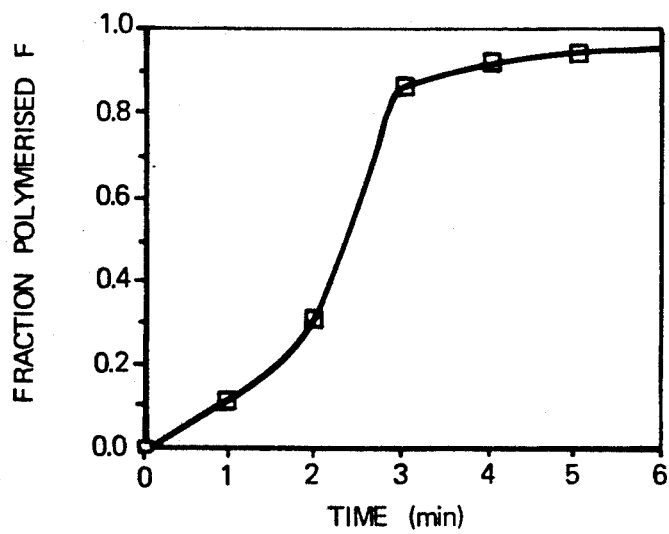
FIG. 5 is a graph showing the curing curve of a contact lens material irradiated as described in example 2.

A sample of 10 micro-liters of conventional hydrogel monomer mix was spread on a CaF substrate and exposed in an oxygen free chamber to an $N_2$ laser emitting a laser beam of 337 nm pulses at a 4 Hz repetition frequency and with a pulse energy of 0.3 mJ. The degree of polymerisation was monitored periodically using the infrared technique described above. The results are shown in FIG. 5 which is a graph similar to that of FIG. 4. As shown, the sample was approximatley 85% polymerised after three minutes and almost completely polymerised after six minutes.

EXAMPLE 3

Figure 6:
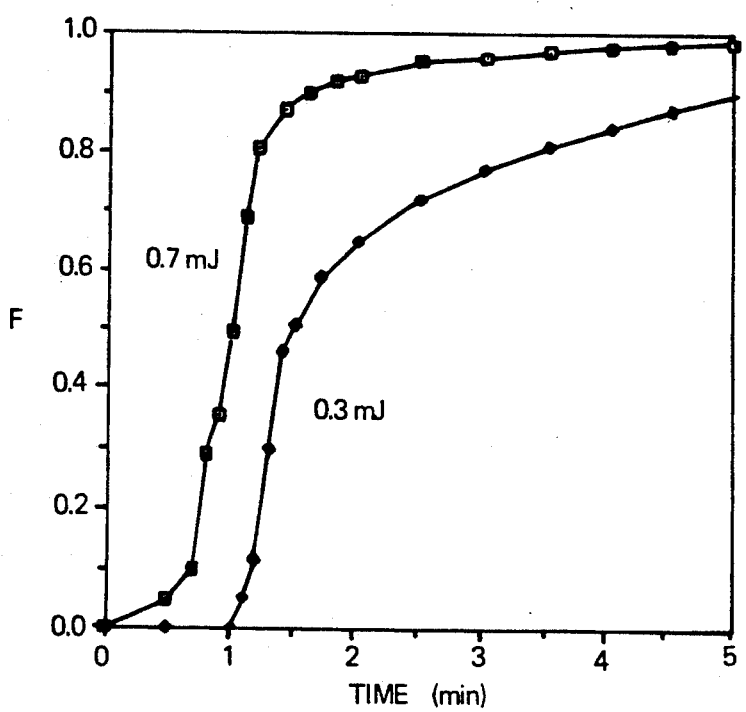
FIG. 6 is a graph showing curing curves of a contact lens material irradiated as described in example 3.

A sample of 10 micro-liters of conventional hydrogel monomer mix was spread on a NaCl substrate and exposed in an oxygen free chamber to an $N_2$ laser emitting a laser beam of 337 nm pulses at 100 Hz repetition frequency and with a pulse energy of 0.7 mJ. The degree of polymerisation was monitored continuously using the infrared technique described above. A similar sample of monomer mix was similarly exposed to the laser irradiation but with the $N_2$ laser operating at 100 Hz repetition frequency but with a pulse energy of 0.3 mJ. The results are shown in FIG. 6 which is a graph similar to that in FIG. 5. As shown, 0.7 mJ pulses appear to be the least energy required to achieve over 90% curing in two minutes.

EXAMPLE 4

Figure 7:
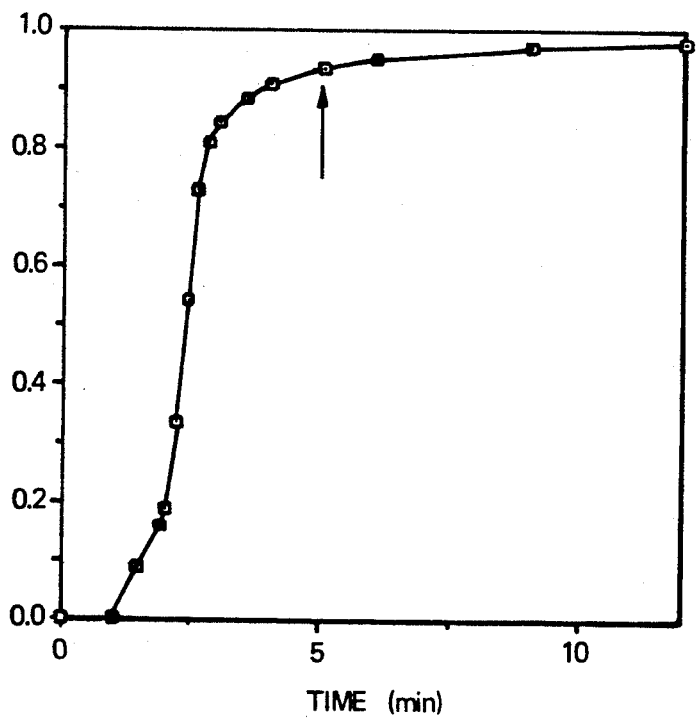
FIG. 7 is a graph showing a curing curve of a contact lens material irradiated as described in example 4.

A sample of 10 micro-liters of conventional hydrogel monomer mix was spread on a NaCl substrate and exposed in an oxygen free chamber to an $N_2$ laser emitting a laser beam of 337 nm pulses at 10 Hz repetition frequency and with a pulse energy of 0.75 mJ. The degree of polymerisation was monitored continuously using the infrared technique described above. The results are shown in FIG. 7 from which it will be observed that 90% curing was achieved in five minutes at which time the laser was switched off however, the curing continued reaching 100% cure in about 1.5 hours in the absence of further irradiation.

EXAMPLE 5

Figure 8:
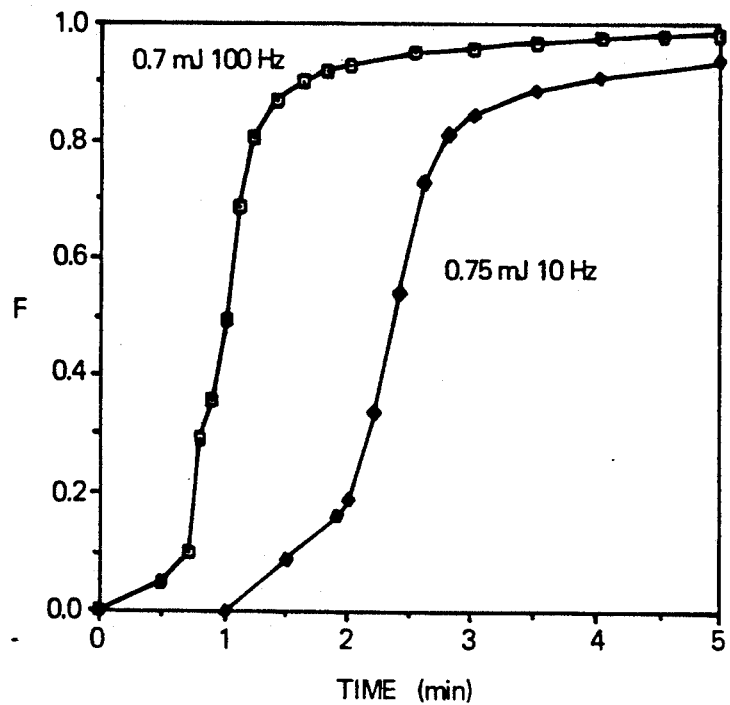
FIG. 8 is a graph showing curing curves of a contact lens material irradiated as described in example 5.

A sample of 10 micro-liters of conventional hydrogel monomer mix was spread on a NaCl substrate and exposed in an oxygen free chamber to an $N_2$ laser emitting a laser beam of 337 nm pulses at 100 Hz repetition frequency and with a pulse energy of 0.7 mJ. The degree of polymerisation was monitored continuously using the infrared technique described above. A similar sample of monomer mix was also spread on an NaCl substrate and was exposed in an oxygen free environment to an $N_2$ laser emitting a laser beam of 337 nm pulses at 10 Hz repetition frequency and with a pulse energy of 0.75 mJ. The sample was monitored and the results are shown in FIG. 8 from which it will be noted that at the lower pulse rate of 10 Hz the curing rate was slower. The lower rate of 10 Hz simulates the effect which would be obtained if say a laser operating at 100 Hz repetition rate was used to sequentially scan ten samples.

EXAMPLE 6

Figure 9:
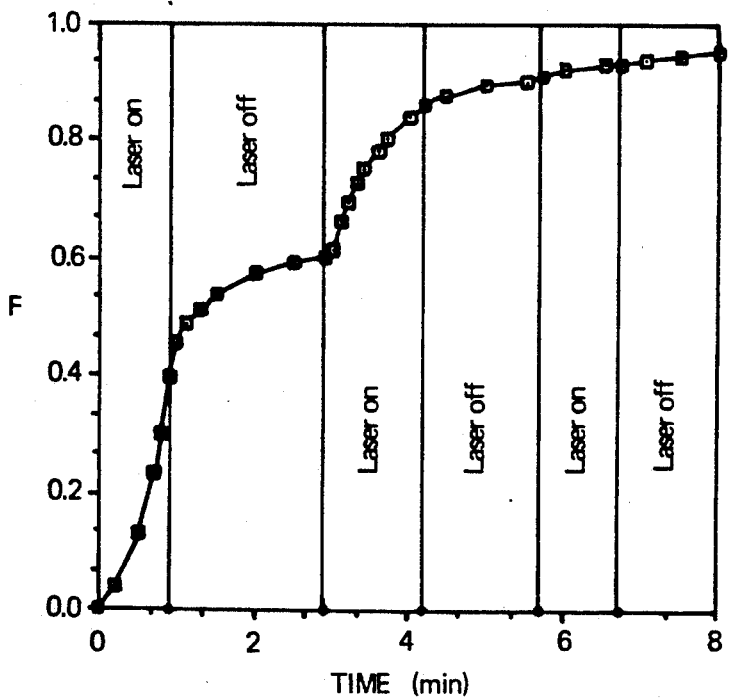
FIG. 9 is a graph showing a curing curve of a contact lens material irradiated as described in example 6.

A sample of 10 micro-liters of conventional hydrogel monomer mix was spread on a NaCl substrate and exposed in an oxygen free chamber to an XeF excimer laser with 4 mJ pulses at 100 Hz repetition rate. The laser was intermittently switched on and off and the degree of polymerisation was monitored continuously using the infrared technique described above. The results are shown in FIG. 9 from which it will be noted that curing clearly continues after the laser has been turned off (the value of F rises from 0.4 to 0.6 during the two minutes after the initial laser irradiation phase). Once the fraction cured reaches about 0.9 however, the presence of the laser beam appears to have only a minimal affect on the curing rate.

EXAMPLE 7

Figure 10:
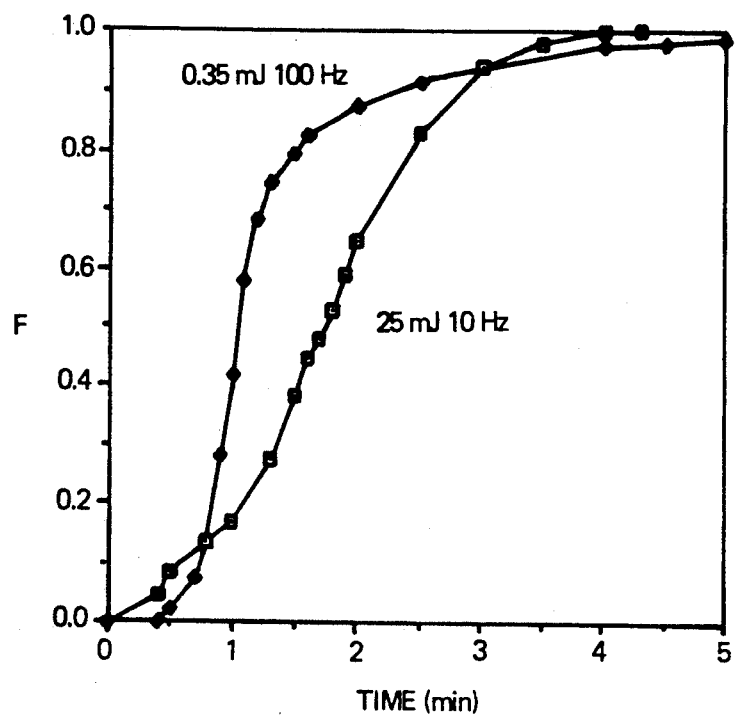
FIG. 10 is a graph showing curing curves of a contact lens material irradiated as described in example 7.

A sample of 10 micro-liters of conventional hydrogel monomer mix was spread on a NaCl substrate and exposed in an oxygen free chamber to an XeF excimer laser with 0.35 mJ pulses at 100 Hz repetition rate. A similar sample was also spread on a Nacl substrate and exposed in an oxygen free chamber to an XeF excimer laser with 25 mJ pulses at 10 Hz repetition rate. The degree of polymerisation was monitored continuously and the results are shown in FIG. 10. The upper trace at the 100 Hz repetition rate has an average irradiated power of 35 mW yet it has a faster initial cure rate than the 10 Hz trace which has an average power of 250 mW. It appears that a higher repetition rate produces a higher initial cure rate.

EXAMPLE 8

A sample of 26 micro-liters of conventional hydrogel monomer mix was deposited in a contact lens mould (see FIG. 1) rotating at a speed of 350 rpm. The sample was exposed in an argon atmosphere to an $N_2$ laser beam (337 nm) operating at 100 Hz repetition rate with a pulse energy of 3 mJ. After 2 minutes the mould was removed from the argon atmosphere, and soaked in hot water after which the polymerised contact lens was removed. The contact lens was free from visual blemishes and judged to be suitable for use.

The technique for monitoring the degree of polymerisation of a sample of contact lens material during laser irradiation can normally only be carried out on thin samples of lens material. The technique cannot be carried out successfully on samples of contact lens material which are of sufficient volume to produce an actual contact lens as such volumes are too great to enable a quantitative measurement of the transmission spectrum of an infrared light beam. The results of the tests on the small volumes in examples 1 to 7 clearly demonstrate the parameters for successful photopolymerisation of a conventional contact lens material.

Figure 11:
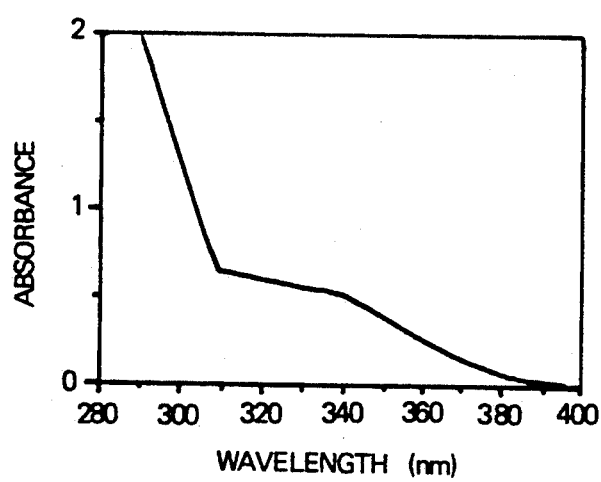
FIG. 11 shows the absorption spectrum of a cured sample of contact lens material.

In FIG. 11 there is shown the absorption spectrum of a 1.4 mm thick cured sample of a conventional hydrogel contact lens material. From this curve the optimum curing laser wavelengths are determined. As shown, laser light above 380 nm is impractical since only a small fraction of it will be absorbed (8% over a 1 mm depth). On the shorter wavelength side, the material absorbs strongly around 300 nm and below and so only very thin layers could be cured with these wavelengths. It appears that the optimum laser wavelengths for photopolymerisation is within a range of approximately 300 nm to approximately 380 nm and so the most useful lasers are likely to be the XeCl and XeF excimer lasers (308 and 351 nm respectively) and the $N_2$ laser (337 nm).

The invention is not limited to the embodiments described herein which maybe modified or varied without departing from the scope of the invention.

We claim:

1. A process for curing a photopolymerizable contact lens material comprising the step of irradiating the photopolymerizable contact lens material with pulsed ultraviolet laser radiation having a wavelength of between approximately 200 nm to approximately 400 nm for a predetermined time period.

2. A process as claimed in claim 1, wherein the contact lens material is irradiated in an oxygen free environment.

3. A process as claimed in claim 1, wherein the contact lens material is irradiated in the presence of a gas unreactive relative to the contact lens material under the conditions of curing.

4. A process as claimed in claim 3, wherein the gas is argon or nitrogen.

5. A process as claimed in claim 1 wherein the contact lens material is rotated in a mould during irradiation.

6. A process as claimed in claim 1, wherein the laser radiation has a wavelength of between approximately 300 nm to approximately 380 nm.

7. A process as claimed in claim 6, wherein the contact lens material is irradiated in an oxygen free environment.

8. A process as claimed in claim 6, wherein the contact lens material is irradiated in the presence of a gas unreactive relative to the contact lens material under the conditions of curing.

9. A process as claimed in claim 6 wherein the contact lens material is rotated in a mould during irradiation.

* * * * *